United States Patent [19]
Lindner et al.

[11] Patent Number: 4,522,964
[45] Date of Patent: Jun. 11, 1985

[54] POLYMER POWDERS CONTAINING GRAFT POLYMER

[75] Inventors: Christian Lindner, Cologne; Walter Uerdingen, Leverkusen; Jürgen Hinz; Ludwig Trabert, both of Krefeld, all of Fed. Rep. of Germany

[73] Assignee: Bayer Aktiengesellschaft, Leverkusen-Bayerwerk, Fed. Rep. of Germany

[21] Appl. No.: 594,345

[22] Filed: Mar. 28, 1984

[30] Foreign Application Priority Data

Apr. 7, 1983 [DE] Fed. Rep. of Germany ....... 3312541

[51] Int. Cl.³ .................... C08L 31/04; C08L 33/06; C08L 33/20; C08L 51/04

[52] U.S. Cl. ...................... 524/71; 525/80; 525/222; 525/227; 525/228; 525/230; 525/241; 525/934

[58] Field of Search ............ 525/70, 71, 80, 934, 525/222, 227, 228, 230, 241; 524/352

[56] References Cited

U.S. PATENT DOCUMENTS 3,864,432  2/1975  Adler et al. .................. 525/934

FOREIGN PATENT DOCUMENTS 2135266  7/1971  Fed. Rep. of Germany ...... 523/352

Primary Examiner—Allan M. Lieberman
Attorney, Agent, or Firm—Connolly and Hutz

[57] ABSTRACT

The invention relates to an improved process for the production of polymer powders based on graft polymers and optionally rubber-elastic polymers and vinyl monomer polymers.

11 Claims, No Drawings

POLYMER POWDERS CONTAINING GRAFT POLYMER

This invention relates to an improved process for the production of polymer powders based on graft polymers and optionally rubber-elastic polymers and vinyl monomer polymers.

Graft polymers which are based on rubber, such as so-called ABS—, MBS— or ASA polymers, are often constituents of thermoplastic moulding compositions. The rubber content of the graft polymers may vary substantially. Depending on the field in which they are to be used, the graft polymers may be combined with special resinous thermoplasts and ungrafted rubbers. Graft polymers which have a particle-like structure are preferably produced by emulsion polymerisation. They then have characteristic structural parameters which are virtually unobtainable by other polymerisation processes, and they are, for example, suitable for the rubber modification of polyvinyl chloride and other thermoplastic resins. The graft polymers must be in powder form for the production of such modified moulding compositions.

For the production of mixtures consisting of, for example, graft polymers, vinyl polymer resins and rubbers, suitable polymer latices may be produced by emulsion polymerisation, mixed together and then precipitated together. However, in most cases, this does not produce commercially usable powders, but coarse materials which are agglomerated to a greater or lesser extent and which cannot be processed technologically, and require subsequent processing (grinding, powdering).

Many powders, which contain graft polymers and are advantageous from a technological point of view for polyvinyl chloride modification, have total compositions which mean that it is impossible directly to work up latex mixtures into powders by joint precipitation of the mixtures.

The present invention provides a process for the production of polymer mixtures in powder form consisting of (A) from 95 to 20%, by weight, of at least one flexible rubber-elastic polymer having a glass transition temperature of $\leq 35°$ C. and/or of a graft rubber, the rubber proportion of which amounts to from 50 to 95% by weight, and which has a glass transition temperature of $<20°$ C. and is at least partially cross-linked, and (B) from 5 to 80%, by weight, of a rigid thermoplastic polymer of styrene, α-methylstyrene, acrylonitrile, methyl methacrylate and mixtures thereof and/or of a graft ruber, the rubber proportion of which amounts to less than 50%, by weight, and which has a glass transition temperature of $<20°$ C., characterised in that, in a first stage, a latex of (A) or a mixture of a latex of (A) and some of the latex of (B) which is required is coagulated at a temperature of from 20° to 100° C. by adding a coagulating agent, in a second stage, the latex of (B) or the remaining part of the latex of (B) is added, so that the desired quantity ratio of (A) and (B) is attained, and more coagulating agent and/or water is optionally added at the same time or thereafter, until a solids/water weight ratio of from 1:3 to 1:15 is attained, and in a third stage, the precipitated mixture of (A) and (B) is separated from the aqueous phase and dried, the portion of graft polymer in the mixture which is obtained being at least 10%, by weight, and preferably from 20 to 50%, by weight.

In a preferred process, latex mixtures of A and B are used in the first stage. After coagulation of this latex mixture, the remaining part of the polymer B (in in the form of a latex) is added to said latex mixture during the second stage of the process. This remaining part of B is then to be calculated so that, during the second stage of the process, from 5 to 30%, by weight of B (based on the total mixture of A and B) are then metered or fed into the mixture in latex form. In the first stage, mixtures consisting of diene-monomer- or alkyl acrylate rubbers (as A) and graft rubbers (as B) are more preferably used. Then, in the second stage of the process, more graft rubber B is introduced in a quantity of from 5 to 25% by weight (based on the total mixture).

Polymer powders which are preferred, according to the present invention, consist of from 95 to 40%, by weight, of (A) and from 5 to 60%, by weight, of (B).

Other powders which are particularly preferred are powders in which A represents grafted acrylate rubbers and B represents rubber-free vinyl polymers.

The powders according to the present invention contain, as rubber-like polymers A, in particular rubbers from the series of diene- or alkyl acrylate homo- or copolymers with styrene, acrylonitrile, methyl methacrylate, vinyl acetate or vinyl ether. They may be non-cross-linked, partially cross-linked or highly cross-linked and preferably have particle-like structures of from 50 to 1,000 nm in size. Graft rubbers A which are preferred include graft products of styrene, acrylonitrile, methyl methacrylate or mixtures thereof on diene or alkyl acrylate rubbers having a rubber content, based on the graft polymer, of from 50 to 95%, by weight, and preferably from 70 to 90%, by weight. Mixtures consisting of at least two different polymers, e.g. consisting of different graft polymers, different rubbers or in particular consisting of one rubber and one graft polymer, are more preferred.

Component A may be a rubber having a glass transition temperature of $\leq 35°$ C., for example, a homo- or copolymer of conjugated dienes, in particular butadiene with olefinically unsaturated monomers, in particular vinyl monomers, such as styrene, acrylonitrile, alkyl(meth)acrylates, vinyl esters, vinyl ethers, vinyl ketones or a homo- or copolymer of $C_1$–$C_{10}$ alkyl acrylates, in particular $C_4$–$C_8$ alkyl acrylates, with olefinically unsaturated monomers, in particular vinyl monomers, such as styrene, acrylonitrile, alkyl methacrylates, vinyl esters and vinyl ethers. These polymers are present in the corresponding latices as particles having a diameter ($d_{50}$) of from about 50 to 500 nm, in particular from 100 to 400 nm. They are preferably at least partially cross-linked and have a gel content of from 50 to 98%, by weight. They may be produced by radically initiated emulsion polymerisation in aqueous media, according to known processes.

Component A may also be a graft rubber and may then also be produced by emulsion polymerisation. It is then a graft polymer of vinyl monomers, in particular styrene, acrylonitrile, methyl methacrylate, α-methylstyrene or mixtures thereof on emulsion rubbers having a glass transition temperature of $<20°$ C. Rubbers which are particularly suitable as a graft base are cross-linked rubbers, having a particle-like structure (particle diameter ($d_{50}$) of preferably from 100 nm to 1,000 nm). The following are examples thereof: homo- and co-polymers of conjugated dienes with styrene, acrylonitrile, alkyl acrylates or mixtures thereof, and homo- and copolymers of alkyl acrylates with styrene, acrylonitrile, methyl methacrylate, vinyl ethers, vinyl ketones, and polyfunctional alkyl or vinyl monomers. The acrylate rubber particles may contain embedded therein a core of another polymer.

Component A may also represent a mixture consisting of different graft rubbers or consisting of different rubber-elastic polymers or graft rubbers and rubber-elastic polymers. The following are preferred examples thereof: graft rubbers of styrene, acrylonitrile, methyl methacrylate on diene or alkyl acrylate rubbers in admixture with diene rubbers or alkyl acrylate rubbers, and graft rubber mixtures, the constituents of which differ in at least one structural parameter, such as rubber content, chemical composition, particle size or cross-linking.

Component B will now be described in the following. Component B is a thermoplastic vinyl polymer or a graft rubber or mixtures consisting of thermoplastic vinyl polymer and graft rubber, in particular in a weight ratio of graft rubber:vinyl polymer of from 99:70 to 1:30.

Thermoplastic vinyl polymers B which are based on styrene, α-methylstyrene, acrylonitrile, methyl methacrylate or mixtures thereof may be noncross-linked, partially cross-linked or highly cross-linked. They may be produced by emulsion polymerisation. They are preferably noncross-linked and preferably have viscosities represented by $$\eta spec/C$$

(where C=5 g/l at 25° C.) of from 10 to 2,000, measured in dimethylformamide, preferably from 10 to 50 and from 200 to 2,000. Styrene/acrylonitrile-copolymers, polymethyl methacrylate, methyl methacrylate/acrylonitrile copolymers and α-methylstyrene copolymers are preferred.

Graft rubbers B contain less rubber than graft rubbers A, that is usually from 10 to 50%, by weight, preferably from 10 to 35%, by weight. They also represent emulsion polymers of vinyl monomers on diene or alkyl acrylate rubbers, in particular of styrene, acrylonitrile, methyl methacrylate or mixtures thereof on particle-like, cross-linked rubbers.

Preferred graft rubbers (B) are graft polymers of styrene, α-methylstyrene, acrylonitrile, methyl methaa-crylate or mixtures thereof of diene rubbers or alkyl acrylate rubbers, having a rubber proportion of up to 50%, by weight, preferably from 20 to 40%, by weight, based on the graft polymer. Rubbers which are particularly preferred include polybutadiene and polyalkyl acrylates having a high degree of cross-linking and a particle-like structure.

The polymer mixtures, according to the present invention, may be produced in powder form, by the following steps: in a first stage coagulating, latices of the polymers A or mixtures of latices of polymers A and B, optionally after stabilisation, for example, with phenolic antioxidants, at from 20° to 100° C., preferably from 50° to 100° C., by acids, bases or water-soluble salts, optionally with the addition of water, a sediment-depositing suspension of the polymers being formed with stirring; then, in a second stage, introducing more polymer B in latex form in a quantity such that the desired weight ratio of A:B (total composition) reaches from 95 to 20%, by weight, of A and from 5 to 80%, by weight, of B, and optionally then adding water and coagulating agent, so that a suspension is produced which has a solids/water weight ratio of from 1:3 to 1:15, and subsequently, in a third stage, separating the resulting polymer mixture which has been produced from the suspension, e.g. by filtration or centrifugation, and then drying the mixture, so that a powder having an average particle diameter of from 0.05 to 5 mm is obtained.

According to the present invention, coagulation may be carried out semicontinuously or fully continuously, the continuous mode of operation being preferred.

The powders which are produced according to the present invention are distinguished by an improved pourability and storage-stability (also at a relatively high storage temperature), a reduced tendency to form dust, an easy commercial handling ability and an ability to be metered in continuously operating mixing apparatus for the production of thermoplastic moulding compositions.

The powders which are produced, according to the present invention, may be worked up, optionally after the addition of conventional processing auxiliaries, to produce thermoplastic moulding compositions, which have good strength, matt or shiny surfaces, and an improved natural shade.

The powders which are produced according to the present invention are particularly suitable for the modification of conventional ABS—, MBS—, ASA and vinyl chloride polymers (PVC), because they may be distributed and dispersed particularly easily in the melts of these polymers (even if they contain cross-linked graft rubber particles). Long residence times, elevated temperatures and intense shearing forces during compounding are avoided and thus damage to the thermoplastic moulding compositions during compounding is also avoided. Moulding compositions result which have improved properties, a good uniformity (films free of specks) and thus also improved properties in terms of use.

ABS-polymers which are suitable for modification are graft polymers of styrene/acrylonitrile mixtures on diene monomer rubbers having a rubber content of from 5 to 40%, by weight. They may also contain proportionally different quantities of ungrafted styrene-acrylonitrile or α-methylstyrene-acrylonitrile copolymers.

MBS-polymers which are suitable for modification are graft polymers of methyl methacrylate, optionally in admixture with styrene, on diene monomer rubber, which may contain styrene as a comonomer. On the other hand, ASA-polymers are graft polymers of styrene-acrylonitrile mixtures on cross-linked alkyl acrylate rubbers which have, for example, a rubber content of from 5 to 40%, by weight.

EXAMPLES

I.

(A) Latices of rubbers and graft rubbers which are used (Product A):
  (1) A latex of a butadiene-acrylonitrile copolymer which has an acrylonitrile content of 30%, by weight, and an average latex particle diameter ($d_{50}$) of 0.15 μm; gel proportion 75%, by weight.

(2) A latex of a cross-linked butyl acrylate-acrylonitrile copolymer which has an acrylonitrile content of 30%, by weight, and an average latex particle diameter ($d_{50}$) of 0.15 μm; gel proportion 85%, by weight.

(3) A latex of a cross-linked, coarsely-divided poly-n-butyl acrylate, which is grafted with methyl methacrylate (and the particles of which have, as a core, cross-linked polybutadiene with an average particle diameter of 0.1 μm) and has an average latex particle diameter ($d_{50}$) of 0.45 μm; the graft polymer contains 80%, by weight, of rubber.

(4) A latex of a cross-linked, coarsely-divided poly-n-butyl acrylate, corresponding to the structure given in (3), which is grafted with styrene/acrylonitrile (weight ratio of 72:28). The graft polymer contains 80%, by weight, of rubber.

(B) Latices of thermoplastic vinyl monomer polymers and of graft rubbers which are used (Product B):

(1) A latex of a graft polymer of styrene and acrylonitrile (in a weight ratio of 66:34) on cross-linked polybutadiene, having an average particle diameter ($d_{50}$) of 0.4 μm. The graft polymer contains 30%, by weight, of rubber.

(2) A latex of a polymethyl methacrylate having an L-value (measured on DMF) of 22.

(3) A latex of a styrene-acrylonitrile copolymer (containing 30% of acrylonitrile) which has an L-value (measured on DMF) of 1,400.

(4) A latex of a graft polymer of styrene and acrylonitrile (in a weight ratio of 66:34) on cross-linked poly-n-butyl acrylate, having an average latex particle diameter ($d_{50}$) of 0.45 μm. The graft copolymer contains 25%, by weight, of rubber.

II. Preparation of the powders according to the present invention

Latices of polymer A are optionally mixed with latices of polymer B and subsequently stabilised with 1.2% of a phenolic antioxidant. The latex quantities are chosen such that x parts by weight of polymer A and y parts by weight of polymer B are contained in the latex mixture or in the latex. These latices are then mixed at 95° C. with a solution of 150 parts by weight of $MgSO_4 \cdot xH_2O$ (Epsom salt) and 50 parts, by weight, of acetic acid in 5,000 parts, by weight, of water (based on 1,000 parts, by weight, of polymer solids of the latices) as an electrolyte solution, and coagulated. After all the polymer is coagulated, a further z parts, by weight, of polymer B (in the form of a stable latex) are introduced at 95° C. into the suspension which has been produced, so that this latex also coagulates. Thereafter, the total suspension is heated for half an hour at from 95° to 98° C. After cooling to 20° C., it is filtered with centrifuges and then washed until it is free of electrolyte. The moist material is then dried at 70° C.

III. Comparison

In this case, latices of polymer A are mixed with latices of polymer B, and the quantities of latex are chosen such that there are x parts, by weight, of A and (y+Z) parts, by weight, of B in the mixtures. After the mixture has been stabilised, as in II, it is precipitated with an aqueous $MgSO_4 \cdot xH_2O$/acetic acid solution having a composition as in II (5,200 parts, by weight, of electrolyte solution are used per 1,000 parts, by weight of polymer A+B). After coagulation at 95° C., the complete suspension is heated for half an hour at from 95° to 98° C. Working up is continued, as in II.

TABLE 1

|  | (IV) Powders which are produced | | | | |
|---|---|---|---|---|---|
| Powder | A Parts, by weight (x) | B parts, by weight (y) | B parts, by weight (z) | Process II | Process III |
| 1 | Polymer A1 40 | Polymer B1 50 | Polymer B1 10 | x | |
| 2 | Polymer A2 40 | Polymer B4 50 | Polymer B4 10 | x | |
| 3 | Polymer A1 40 | Polymer B1 50 | Polymer B1 10 Polymer B3 2.5 | x | |
| 4 | Polymer A3 90 | — | Polymer B2 10 | x | |
| 5 | Polymer A4 90 | — | Polymer B2 10 | x | |
| 6 | Polymer A1 40 | Polymer B1 50 | Polymer B1 10 | | x |
| 7 | Polymer A4 90 | — | Polymer B2 10 | | x |

(V) Properties of the Powders

| Grain size analysis of the dried Powders IV | | |
|---|---|---|
| | Grain size (mm) | Percentage Proportion (%, by weight) |
| Powder 1: | >1 | 72.4 |
| | 0.8–1 | 4.5 |
| | 0.4–0.8 | 10.3 |
| | 0.2–0.4 | 3.8 |
| | 0.1–0.2 | 4.9 |
| | 0.05–0.1 | 3.3 |
| | <0.05 | 0.8 |
| Powder 2: | >1 | 65.2 |
| | 0.8–1 | 6.9 |
| | 0.4–0.8 | 15.5 |
| | 0.2–0.4 | 7.0 |
| | 0.1–0.2 | 4.0 |
| | 0.05–0.1 | 1.1 |
| | <0.05 | 0.2 |

| Packing strength (lbs) of powders IV 1 and IV 7 | | |
|---|---|---|
| | Powder 1 | Powder 7 |
| No bridging | 40$^{19''}$ [1] | 10$^{45''}$ [1] |
| Bridging | 40 | 15 |

[1] Numbers in superscript represent the holding time of the bridges, in seconds.

Powders 4, 5 and 7 are centrifuged in a centrifuge 40 cm in diameter which rotates at 3,000 rpm (in each case 1 kg of solid polymer was used), and the products are subsequently washed until free of electrolyte. The total isolation process lasts 20 mins.

The following characteristics may be established: powders 4 and 5 may be isolated from the centrifuge chamber as aqueous powders.

Powder 7 forms a cohesive filter cake which may only be broken up into individual particles by extensive mechanical means. This product has to be ground as a moist substance.

The moist powders 4, 5 and 7 are subsequently dried at 70° C. in a drying chamber for 24 hours, and may then be characterised as follows:

Powders 4 and 5 are pourable materials having a high storage stability. Powder 7 is partially caked and agglomerated into coarse particles.

DESCRIPTION OF THE TEXT METHOD/ABBREVIATIONS WHICH ARE USED

Particle size analysis

Analysis is carried out using a test sieving apparatus. The test sieves are standardised according to DIN 4188. The sieve apparatus operates with vibration sieves. (Manufacturer: Harer and Brecker, type EMC. 200-61).

The L-value corresponds to $\eta\text{spec}/C$, where $C=g/l$ in DMF at 25° C.

The particle sizes represent average particle diameters $d_{50}$ (c.f. "Ultracentrifuge Measurements" by W. Scholtan et al Kolloidz. u.Z. Polymers 250 (1972), 783–796). In emulsions the diameters are determined by ultracentrifuge measurements and in powders by sieve analysis. The average particle diameters are weight average values.

The packing strength was determined by following ASTM-D 1937-70, according to the EDV-test process 499. Determining the packing strength serves to establish a "bridge formation" of powders in a cylindrical drum under the influence of a force and is defined as the lowest force, at which bridging occurs. The magnitude of the packing strength gives an indication of the pourability of a powder.

We claim:

1. A process for the production of polymer mixtures in powder form having an average particle diameter of 0.05–5 mm which comprises:
   (i) coagulating in a first stage, a latex of (A) or a mixture of a latex of (A) and a portion of the requisite amount of a latex of (B) at a temperature of from 20° to 100° C. by the addition of a coagulating agent, and
   further coagulating in a second stage the product from (i) with a latex of (B) or the remaining portion of the requisite amount of the latex of (B) whereby the desired quantity ratio of (A) and (B) is attained, and until a solids/water weight ratio of from 1:3 to 1:15 is attained, and
   (iii) separating in a third stage the precipitated mixture of (A) and (B) from the aqueous phase and drying the product wherein the proportion of graft polymer in the product obtained is at least 10%, by weight; wherein
   (A) is from 95–20% by weight of the polymer mixture and comprises:
      (A1) a rubbery polymer from the series of diene- or alkyl acrylate homo- or copolymers with styrene, acrylonitrile, methyl methacrylate, vinyl acetate or vinyl ether and which has a glass transition temperature of $\leq 35°$ C.; or
      (A2) a graft polymer wherein monomers including styrene, acrylonitrile, methyl methacrylate or mixtures thereof are grafted on diene or alkyl acrylate rubbers and having a rubber content, based on the graft polymer of from 50 to 95%, by weight, and has a glass transition temperature of $<20°$ C.; or
      (A3) a mixture of said rubbery polymer (A1) and said graft polymer (A2); and wherein
   (B) is from 5 to 80% by weight of the polymer mixture and comprises:
      (B1) a rigid thermoplastic polymer of styrene, $\alpha$-methylstyrene, acrylonitrile, methyl methacrylate and mixtures thereof; or
      (B2) a graft polymer wherein monomers including styrene, $\alpha$-methylstyrene, acrylonitrile, methyl methacrylate or mixtures thereof are grafted on diene rubbers or alkyl acrylate rubbers and having a rubber content less than 50%, by weight, based on the graft polymer, and having a glass transition temperature of $<20°$ C.; or
      (B3) a mixture of said rigid thermoplastic polymer (B1) and said graft polymer (B2).

2. A process according to claim 1 wherein the latex of (A) is a butadiene-acrylonitrile copolymer latex.

3. A process according to claim 1 wherein the latex of (A) is a butyl acrylonitrile-acrylonitrile copolymer latex.

4. A process according to claim 1 wherein the latex of (A) is a latex of particles poly-n-butyl acrylate grafted with methyl methacrylate, the particles having as a core of polybutadiene.

5. A process according to claim 1 wherein the latex of (A) is a latex of particles of poly-n-butyl acrylate grafted with styrene and acrylonitrile, the particles having a core of polybutadiene.

6. A process according to claim 1 wherein the latex of (B) is a latex of styrene and acrylonitrile grafted onto polybutadiene.

7. A process according to claim 1 wherein the latex of (B) is a polymethyl methacrylate latex.

8. A process according to claim 1 wherein the latex of (B) is a styrene-acrylonitrile copolymer latex copolymer latex.

9. A process according to claim 1 wherein the latex of (B) is a latex of styrene and acrylonitrile grafted on poly-n-butyl acrylate.

10. A process according to claim 1 wherein from 95–40% by weight of the polymer mixture is component (A) and 5–60% by weight is component (B).

11. A process according to claim 1 wherein a latex mixture of (A) and (B) are coagulated in the first stage (i) and in the second stage (ii) the remaining portion of (B), amounting to 5–30% by weight based on total (A) and (B), is coagulated.

* * * * *